United States Patent [19]
Orton

[11] Patent Number: 5,350,002
[45] Date of Patent: Sep. 27, 1994

[54] ASSEMBLY AND METHOD FOR MAKING A PATTERN OF A HOLLOW COMPONENT

[75] Inventor: Keith Orton, Derby, England

[73] Assignee: Rolls-Royce plc, Derby, England

[21] Appl. No.: 9,071

[22] Filed: Jan. 26, 1993

[30] Foreign Application Priority Data

Feb. 20, 1992 [GB] United Kingdom ............. 9203585

[51] Int. Cl.⁵ ............................................. B22D 29/00
[52] U.S. Cl. .......................................... 164/24; 164/35; 164/45; 164/132; 164/235; 164/340; 249/177; 425/468; 425/DIG. 10
[58] Field of Search ............... 164/28, 30, 132, 340, 164/397, 398, 24, 35, 45, 235; 249/142, 175, 177; 425/468, DIG. 10; 264/221, 317

[56] References Cited

U.S. PATENT DOCUMENTS

| | | | |
|---|---|---|---|
| 111,775 | 2/1871 | Phillips | 164/398 |
| 2,088,736 | 8/1937 | Floyd et al. | 164/397 |
| 3,258,816 | 7/1966 | Rearwin | 249/175 |
| 3,722,577 | 3/1973 | Webb | 164/397 |
| 3,957,104 | 5/1976 | Terpay | 164/132 |
| 4,050,667 | 9/1977 | Kossett | 249/177 |
| 4,078,598 | 3/1978 | Kalso et al. | 164/30 |
| 5,050,665 | 9/1991 | Judd | 164/30 |

FOREIGN PATENT DOCUMENTS

| | | | |
|---|---|---|---|
| 817961 | 8/1959 | United Kingdom . | |
| 073095 | 10/1981 | United Kingdom . | |
| 093755 | 9/1982 | United Kingdom . | |
| 2205261 | 12/1988 | United Kingdom | 164/397 |
| 216060 | 10/1989 | United Kingdom . | |

*Primary Examiner*—Jay H. Woo
*Assistant Examiner*—Robert B. Davis
*Attorney, Agent, or Firm*—Cushman, Darby & Cushman

[57] ABSTRACT

An assembly for making a wax pattern of a hollow component includes a pattern die and a noncircular core which is located within the pattern die. The pattern die is a split die and includes two halves which have shaped internal surfaces to define the external shape of the wax pattern of the hollow component. The core has shaped external surfaces which define the internal shape of the wax pattern of the hollow component. The core has coaxial circular cross-section projections which locate within correspondingly shaped and dimensioned apertures in the pattern die. One of the apertures in the pattern die has a radially extending pin which is arranged to mate in a groove on the projection to locate the core longitudinally. The core is allowed to rotate within the die so that chaplets on the core position the core accurately without imposing strains on the core.

33 Claims, 3 Drawing Sheets

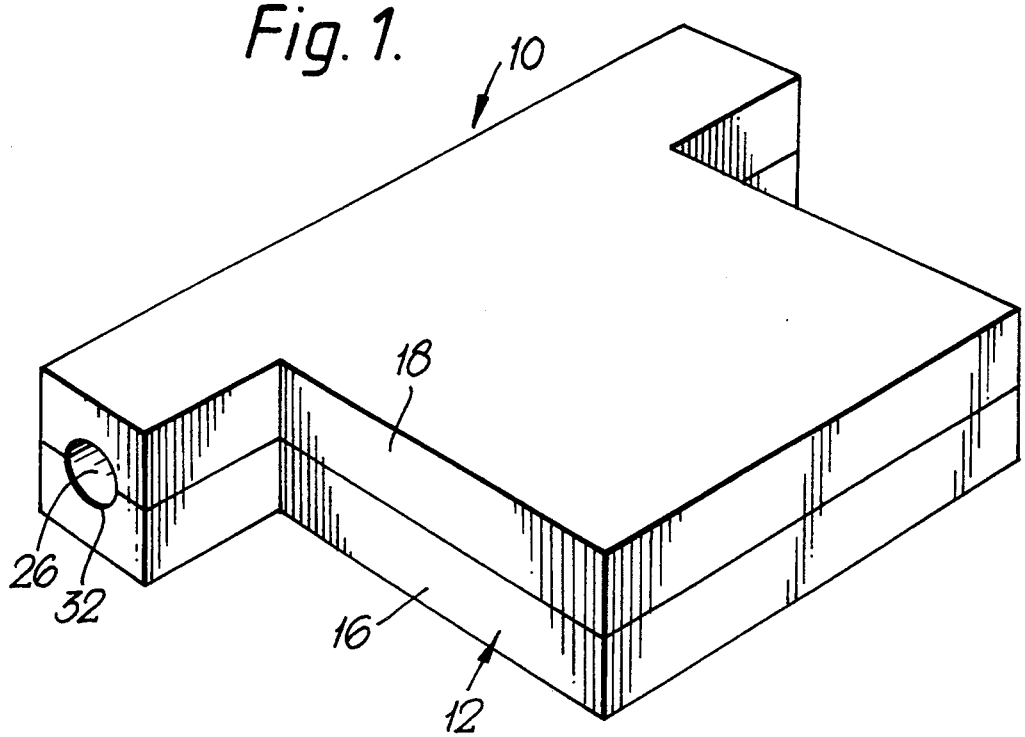
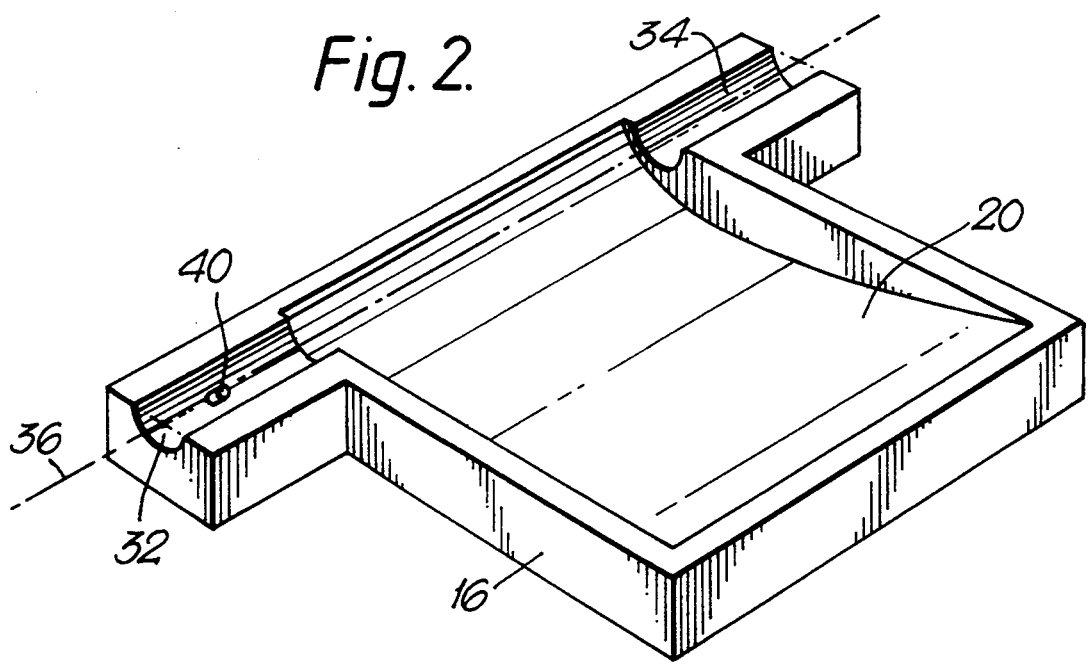

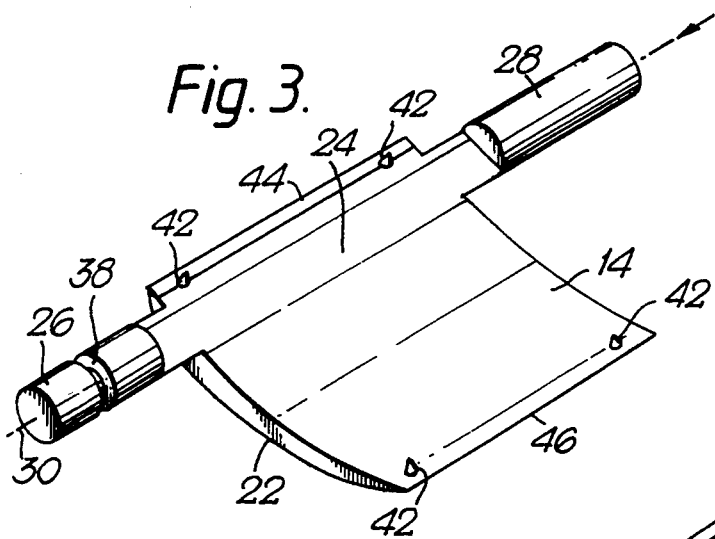
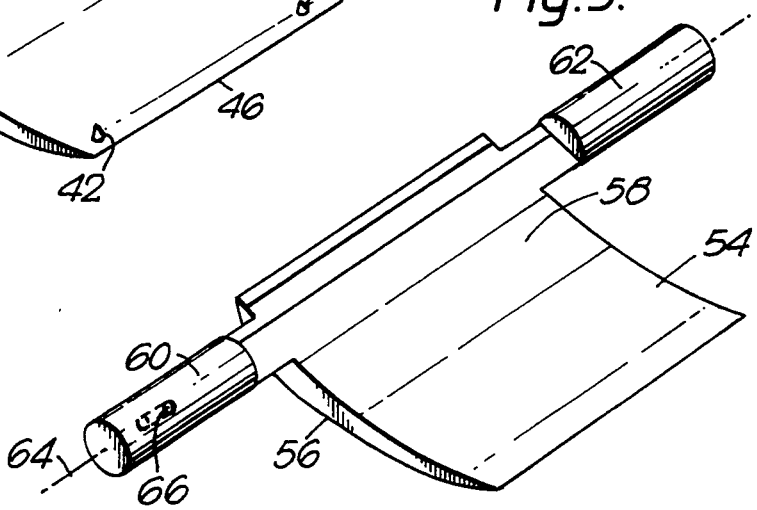
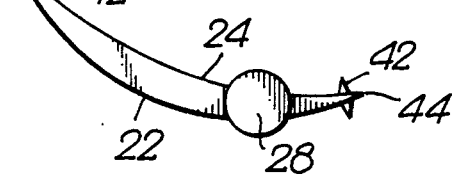
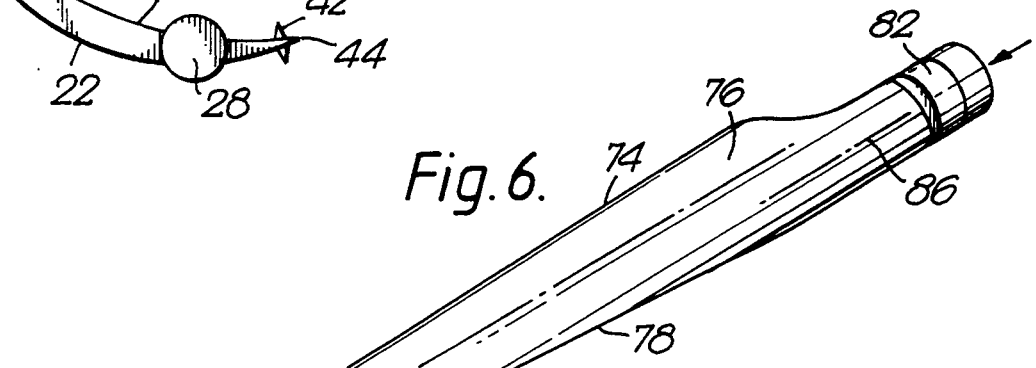

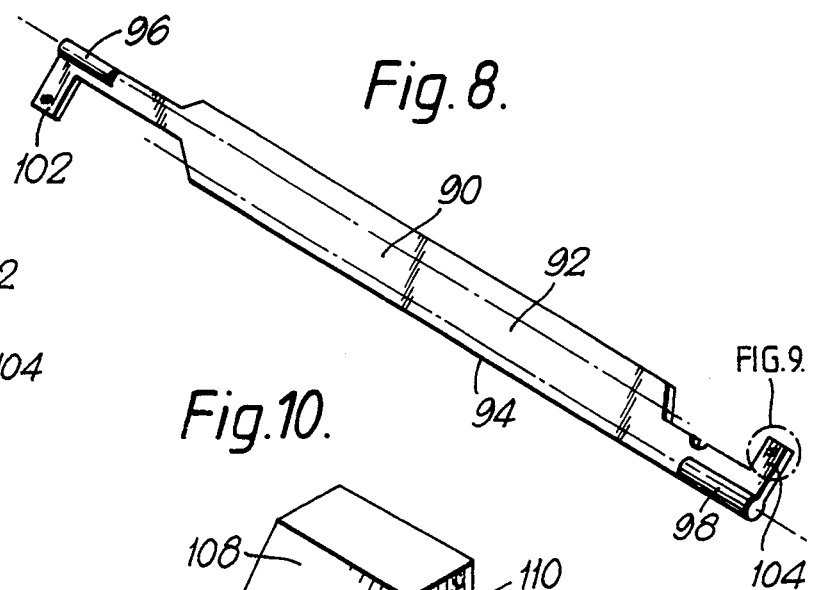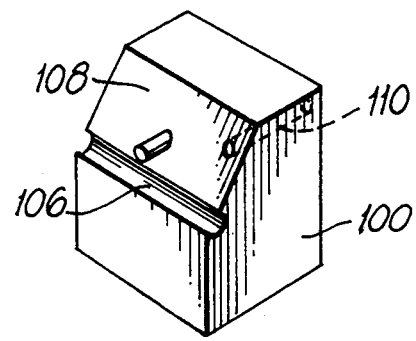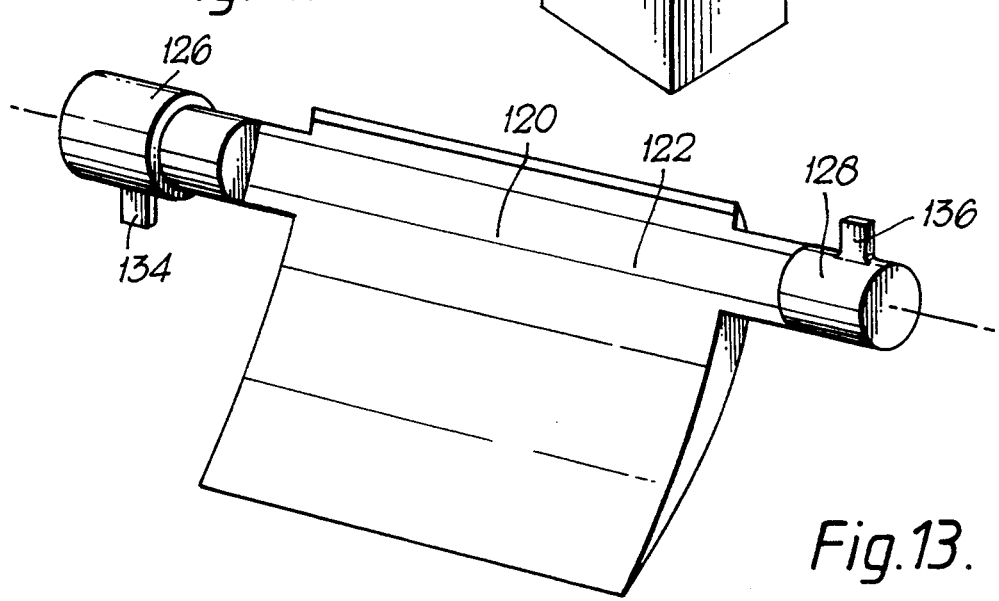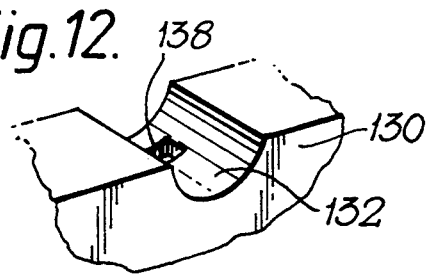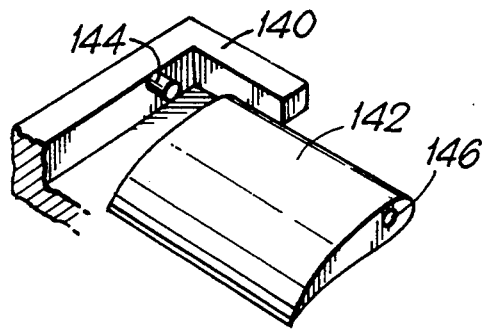

ASSEMBLY AND METHOD FOR MAKING A PATTERN OF A HOLLOW COMPONENT

FIELD OF THE INVENTION

The present invention relates to assemblies for making patterns of hollow components, and is particularly concerned with assemblies for making patterns of hollow turbine blades or turbine vanes. The patterns are used to make moulds for use in the lost wax casting, or investment casting, of components.

BACKGROUND OF THE INVENTION

In the lost wax casting process a wax pattern of a component is produced. The wax pattern is a replica of the component to the produced. Usually a number of wax patterns are assembled together on a wax gating tree to form a cluster or wax mould assembly. The wax mould assembly is immersed in a liquid ceramic slurry which quickly gels after draining, strengthening refractory granules are sprinkled over the ceramic slurry covered wax mould assembly and the refractory granules bond to the slurry coating to produce a ceramic layer on the wax mould assembly. This process is repeated several times to produce many ceramic layers which have a total thickness of about ¼ inch (6 mm) to ½ inch (12 mm) on the wax mould assembly. The wax is then melted out leaving a ceramic shell mould having an internal cavity identical in shape to that of the original wax cluster. This ceramic shell mould is called an investment casting mould. The mould is fired at a high temperature between 950° C. and 1100° C. to purify it by removing all traces of residual wax, while at the same time curing the ceramic shell mould. The ceramic shell mould is then transferred to a casting furnace, which may be operated at either vacuum conditions or at atmospheric conditions. A charge of molten metal is then poured into the ceramic shell mould and the mould is allowed to cool to room temperature, after which the ceramic shell mould is removed leaving the cast component or components.

In the lost wax casting of hollow turbine blades or turbine vanes, the wax patterns of the hollow turbine blades or turbine vanes are produced by injecting wax into a pattern die which has one or more preformed ceramic cores located therein. The pattern die has convex and concave aerofoil shaped surfaces and the ceramic core is spaced from the convex and concave shaped surfaces of the pattern die by chaplets to ensure the correct thickness gap exists between the surfaces of the die and the ceramic core surfaces. The ceramic core has shaped projections which locate in correspondingly shaped apertures in the pattern die. The ceramic core is prevented from moving longitudinally in the pattern die by a precisely positioned pin and slot arrangement.

It is difficult to optimise the position of the ceramic core relative to the pattern die surfaces due to the manufacturing tolerances of size and shape of the ceramic core and also because of distortions within the ceramic core making process. It is particularly difficult to optimise the trailing edge position of the ceramic core relative to the pattern die surfaces due to the distortions of the ceramic core, because the relationship between the trailing edge and the shaped projections of the ceramic core suffers the greatest dimensional variations. The larger the ceramic core the more pronounced is the distortion.

The chaplets fitted to the core are positioned to ensure that the correct thickness of wax is achieved, but where distortion is excessive the point load exerted onto the ceramic core by the chaplet strains the ceramic core, because they are trying to correct the distorted shape against the restraint imposed by the shaped projections of the ceramic core locating in the corresponding shaped apertures in the die. In the extreme case the strain is enough to fracture the brittle ceramic core thus scrapping the wax pattern. If the strain is insufficient to break the ceramic core, there is a residual strain imposed in the ceramic core which, when the wax is removed from the ceramic shell mould, causes the ceramic core to spring back to its free state and subsequently produces a cast turbine blade or turbine vane which has a thin wall section.

SUMMARY OF THE INVENTION

Accordingly the present invention seeks to provide a novel assembly for making a pattern of a hollow component which overcomes the above mentioned problems.

Accordingly the present invention provides an assembly for making a pattern of a hollow component, the assembly comprising a die and a noncircular core which is located within and is in spaced relationship from the die to define the internal shape of a pattern of a hollow component, the noncircular core or the die has shaped projections which locate in correspondingly shaped apertures in the die or noncircular core respectively, the projections extend from opposite ends of the noncircular core or die, at least one of the projections of the noncircular core or die and the corresponding aperture in the die or noncircular core are at least part circular to allow relative rotation between the die and the noncircular core to control the spacing between the die and the noncircular core.

At least one of the projections of the noncircular core and the corresponding aperture in the die may be circular.

Both projections of the noncircular core and both apertures in the die may be circular, the circular projection shares a common axis and the apertures share a common axis. The at least one circular projections of the noncircular core may have a circumferentially extending groove.

The at least one circular projection of the non circular core may have a radially extending hole.

The corresponding aperture in the die may have a radially extending pin arranged to locate in the circumferentially extending groove on the circular projection of the noncircular core to locate the noncircular core longitudinally in the die. The corresponding aperture in the die may have a radially extending pin arranged to locate in the radially extending hole in the circular projection of the noncircular core to locate the noncircular core longitudinally in the die and to locate the noncircular core angularly with respect to the axis of the aperture in the die.

The noncircular core may be manufactured from ceramic material. The pin may be biased or spring loaded. The other projection of the noncircular core may be part circular. The die and the noncircular core may define the shape of a pattern of a hollow turbine blade or turbine vane.

At least one of the circular projections may have a radially extending member, the corresponding aperture has a radial slot in which the member locates.

An adjustable screw may be provided in the die to limit angular movement of the noncircular core. Both projections of the noncircular core may be part noncircular, both apertures of the die are part circular.

At least one of the part circular projections may have a radially extending member the corresponding aperture has a slot in which the member locates.

An adjustable screw may be provided in the die to limit angular movement of the noncircular core.

The present invention also provides a noncircular core for making a pattern of a hollow component, the noncircular core has shaped projections for locating in correspondingly shaped apertures in a die, the projections extend from opposite ends of the noncircular core, at least one of the projections of the noncircular core is at least part circular.

The at least one circular projection of the noncircular core may have a circumferentially extending groove. The at least one circular projection of the noncircular core may have a radially extending hole. The other shaped projection of the noncircular core may be part circular. The noncircular core may be manufactured from ceramic material.

At least one of the projections of the noncircular core may be circular.

At least one of the circular projections may have a radially extending member.

Both projections of the noncircular core may be part circular.

At least one of the part circular projections may have a radially extending member.

The present invention also provides a die for making a pattern of a hollow component, the die having shaped apertures at opposite ends for receiving correspondingly shaped projections of a noncircular core, at least one of the apertures being circular, at least one aperture has a radially extending pin.

Both the apertures in the die may be circular and the axes of the apertures share a common axis.

The pin may be biased or spring loaded. The other aperture in the die may be part circular.

The die may have at least one support member to support the noncircular core in spaced relationship from the die.

The present invention also provides a method of manufacturing a wax pattern of a hollow component comprising (a) placing a noncircular core within, and in spaced relationship from, a die to define the shape of the pattern of the hollow component, the noncircular core having shaped projections which locate in correspondingly shaped apertures in the die, the projections extending from opposite ends of the noncircular core, at least one of the projections of the noncircular core and the corresponding aperture in the die being part circular (b), supplying molten wax into the space between the noncircular core and the die (c), allowing the wax to solidify to form a wax pattern and (d) removing the wax pattern and noncircular core from the die.

Before the noncircular core is placed in the die chaplets may be placed on the noncircular core to maintain correct spacing between the noncircular core and the die.

The present invention also provides a method of manufacturing a hollow metal component comprising (a) making a wax pattern of a hollow component, placing a ceramic noncircular core within, and in spaced relationship from, a die to define the shape of the pattern of the hollow component, the noncircular core having shaped projections which locate in correspondingly shaped apertures in the die, the projections extending from opposite ends of the noncircular core, at least one of the projections of the noncircular core and the corresponding aperture in the die being circular, supplying molten wax into the space between the noncircular core and the die, allowing the wax to solidify to form a wax pattern, removing the wax pattern and noncircular core from the die, (b) assembling the wax pattern on a wax gating tree, to form a wax mould assembly, (c) applying ceramic to the wax mould assembly to form a ceramic mould assembly, (d) removing the wax from the ceramic mould assembly, (e) supplying molten metal into the ceramic mould assembly to form a metal component, (f) removing the ceramic noncircular core from the metal component to form the hollow metal component.

BRIEF DESCRIPTION OF THE DRAWINGS

The present invention will be more fully described by way of example, with reference to the accompanying drawings in which:

FIG. 1 is a perspective view of an assembly for making a pattern of a hollow component according to the present invention.

FIG. 2 is a perspective view of a die half forming part of the assembly shown in FIG. 1.

FIG. 3 is a perspective view of a ceramic core forming part of the assembly shown in FIG. 1.

FIG. 4 is a view in the direction of arrow A in FIG. 3.

FIG. 5 is a perspective view of an alternative ceramic core forming part of the assembly shown in FIG. 1.

FIG. 6 is a perspective view of a further alternative ceramic core forming part of an assembly for making a pattern of a hollow component according to the present invention.

FIG. 7 is a view in the direction of arrow B in FIG. 6.

FIG. 8 is a perspective view of a further alternative ceramic core forming part of an assembly for making a pattern of a hollow component according to the present invention.

FIG. 9 is an enlarged view of part of FIG. 8.

FIG. 10 is a perspective view of part of a die for use with the ceramic core shown in FIG. 8.

FIG. 11 is a perspective view of a further alternative ceramic core forming part of an assembly for making a pattern of a hollow component according to the present invention.

FIG. 12 is a perspective view of a part of a die for use with the ceramic core shown in FIG. 11.

FIG. 13 is an exploded perspective view of part of a further alternative ceramic core and die assembly according to the present invention.

DETAILED DESCRIPTION OF THE INVENTION

An assembly 10 for making a pattern of a hollow component, for example turbine blades or turbine vanes for gas turbine engines is shown in FIGS. 1, 2, 3 and 4. The assembly 10 comprises a pattern die 12 and a core 14 which is located within the pattern die 12.

The pattern die 12 is a split die and comprises two die halves 16 and 18 which define the external shape of the pattern of the hollow component. The die half 16 has a shaped surface 20 which defines the convex aerofoil shaped surface of a pattern of a hollow turbine blade or turbine vane. Similarly the die half 18 has a shaped surface which defines the concave aerofoil shaped surface of a pattern of a hollow turbine blade or turbine vane.

The core 14 defines the internal shape of the pattern of the hollow component. The core 14 has a convex aerofoil shaped surface 22 and a concave aerofoil shaped surface 24. The core 14 also has shaped projections 26 and 28 which are used to locate the core 14 within the die 12.

The shaped projections 26 and 28 locate within correspondingly shaped and dimensioned apertures 32 and 34 in the die 12. The shaped projections 26 and 28 are circular in cross section and they share a common axis 30. The apertures 32 and 34 are also circular in cross-section and share a common axis 36.

One of the projections 26 of the core 14 has a circumferentially extending groove 38 and one of the apertures 32 in the die 12 has a radially extending pin 40. The pin 40 is arranged to locate in the circumferentially extending groove 38 on the projection 26 of the core 24 to locate the core 24 longitudinally in the pattern die 12.

The core 14 has accurately dimensioned chaplets 42 attached thereto to ensure the correct thickness of gap exists between the concave and convex surfaces 24 and 22 of the core 14 and the corresponding convex and concave surfaces 20 of the pattern die 12.

The use of the circular cross-section projections 26, 28 on the core 14 and the correspondingly shaped apertures 32, 34 in the pattern die 12 allow the core 14 to rotate within the pattern die 12. This allows the chaplets 42 at the trailing edge 46 of the core 14 to position the core 14 correctly without imposing a strain on the core 14.

An alternative ceramic core 54, for use in the assembly 10, is shown in FIG. 5. The core 54 defines the internal shape of the pattern of the hollow component. The core 54 has a convex aerofoil shaped surface 56 and a concave aerofoil shaped surface 58. The core 54 also has shaped projections 60 and 62 which are used to locate the core 54 within the die 12.

The shaped projections 60 and 62 locate within the correspondingly shaped and dimensioned apertures 32 and 34 in the die 12. The shaped projections 60 and 62 are circular in cross-section and they share a common axis 64.

The projection 60 of the core 54 has a very closely toleranced radially extending aperture 66, which mates with the radially extending pin 40 in the aperture 32 of the die 12 to locate the core 54 longitudinally and angularly with respect to the axis 64. The positions of the aperture 66 and pin 40 are chosen to give a specific angular relationship with the axis 64 so that the trailing edge 46 of the core 54 is positioned correctly. In this embodiment chaplets may be dispensed with because the correct thickness of gap is determined by the aperture 66 and pin 40 arrangement. However, the chaplets may be retained to support the core 54 to prevent flexing of the core 54 when the molten wax is poured into the assembly 10.

A further alternative ceramic core 74, for use in an assembly, is shown in FIGS. 6 and 7. The core 74 defines the internal shape of the pattern of the hollow component. The core 74 has a convex aerofoil shaped surface 76 and a concave aerofoil shaped surface 78. The core 74 also has shaped projections 80 and 82 which are used to locate the core 74 within the die.

The shaped projections 80 and 82 locate within correspondingly shaped and dimensioned apertures in the die. In this example the shaped projection 80 is circular in cross-section and the shaped projection 82 is aerofoil shaped but has additionally a partial circular cross-section. The axis 84 and 86 of the projection 80 and 82 are not coaxial. It is necessary to arrange for one of the projections to be noncircular in cross-section when the axis, or centre lines, of the projections do not lie on the same line in order to prevent eccentric rotation of the core and accompanying dimensional problems.

The projection 80 has a groove 84 in which a radially extending pin in the aperture of the die is arranged to fit to locate the core 74 longitudinally. Alternatively the projection 80 may have a radially extending aperture in which the pin of the die is arranged to fit.

The pins may be biased or spring loaded radially inwardly.

On directionally solidified, single crystal and some equiaxed turbine blades and turbine vanes platinum pins are welded into the wax aerofoil in intimate contact with the ceramic core surface. An amount of the pin protrudes beyond the wax surface and is subsequently gripped by the ceramic shell mould. These platinum pins support the ceramic cores at the high temperatures to which they are subjected before the molten metal is poured into the ceramic shell mould.

The use of chaplets on the ceramic core creates imperfections on the wax surface which subsequently have to be patched to ensure that the defect is never lower than the level of the rest of the wax aerofoil. The patching generally results in a finished casting which has regions where the metal is higher than the rest of the aerofoil surface. The finished casting has to be abrasively dressed to achieve the desired aerofoil shape.

In producing some turbine blades or turbine vanes it is necessary to use both chaplets and platinum pins.

The pattern die may be provided with support members, or support pins, to support the ceramic core rather than the chaplets on the ceramic core. Preferably the support members are located at positions subsequently to be used for platinum pins to minimise patching of the wax pattern and abrasive dressing of the cast turbine blade or turbine vane.

A further alternative ceramic core 90, for use in an assembly, is shown in FIGS. 8 and 9. The core 90 defines the internal shape of the pattern of the hollow component. The core 90 has a convex aerofoil shaped surface 92 and a concave aerofoil shaped surface 94. The core 90 also has shaped projections 96 and 98 which are used to locate the core 90 within the die.

The shaped projections 96 and 98 locate within apertures 106 in a die 100, shown in FIG. 10. The shaped projections 96 and 98 are both partially circular in cross-section but have members 102 and 104 respectively extending radially from the axis of the corresponding shaped projections 96 and 98. The axes of the projections 96 and 98 are not coaxial. The apertures 106 are part circular in cross-section but have radial cut outs 108 to allow the radial members 102 and 104 and hence the projections 96 and 98 and core 90 to move angularly within the die 100. Adjustable screws 110 in the die 100 are arranged to adjustably limit the angular movement of the members 102 and 104. The advantage of this arrangement is the reduction in the numbers of chaplets used on the core 90, possibly with a complete elimination of chaplets, and reduction or elimination of the need to repair defects on the aerofoil portion of the wax pattern. Alternatively, in FIG. 10 chaplets 112 are fixed to the member 96, 98, instead of using the adjustable screws, to control the angular positioning of the core 90 in the die 100. These chaplets 112 locate in the die 100 in the wax feeder area, subsequent patching of the wax pattern is in an area which is subsequently discarded and does not effect the finished casting.

A further alternative ceramic core 120, shown in FIG. 11, defines the internal shape of the pattern of the hollow component. The core 120 has a convex aerofoil shaped surface 122 and a concave aerofoil shaped surface 124. The core 120 also has shaped projections 126 and 128 which are used to locate the core 120 within a die 130.

The shaped projections 126 and 128 locate within apertures 132 in the die 130, shown in FIG. 12. The shaped projections 126 and 128 are substantially circular in cross-section but have members 134 and 136 respectively extending radially from the axis of the corresponding projections 126 and 128. The axes of the projections 126 and 128 are coaxial. The apertures 132 in the die 130 are substantially circular in cross-section but have radial cut outs 138, in which the members 134 and 136 locate to allow the members 134 and 136 and hence the projections 126 and 128 and core 120 to move angularly within the die 130. Again adjustable screws or chaplets may be provided on the members 134 and 136 to limit the movement of the core 120.

The most troublesome trailing edge region of the core 120 is some distance away from the projections 126 and 128, and there may still be a requirement for a minimum number of chaplets in that region. As the wax enters the cavity between the core and die the core may be pushed one way or the other depending upon the side of the core the wax runs first.

Although the description has referred to the making of patterns of hollow turbine blades or turbine vanes it is equally applicable to the making of patterns of other complex hollow shaped, i.e. noncircular, components. The projections have been shown as being cylindrical, but they may be conical. The present invention uses circular or part circular projections to locate a complex shaped core within a die to allow optimisation of the wall section of the wax pattern.

It may be possible to achieve the angular movement of the core 142 within the die 140 by arranging for the die 140 to have part circular projections 144 which locate within part circular apertures/recesses 146 in the core 142 as shown in FIG. 13.

I claim:

1. An assembly for making a pattern of a hollow component, the assembly comprising a die and a noncircular core which is located within and is in spaced relationship from the die to define the internal shape of a pattern of a hollow component, the noncircular core having two shaped projections which locate in correspondingly shaped apertures in the die, the projections extending from opposite ends of the noncircular core, both of the projections of the noncircular core and the corresponding apertures in the die having a portion that is curved to allow relative rotation between the die and the noncircular core to control the spacing between the die and the noncircular core, each portion having an axis of rotation, the axes of rotation of said projections sharing a common axis and the apertures in said die sharing a common axis.

2. An assembly as claimed in claim 1 in which at least one of the projections of the noncircular core and the corresponding aperture in the die are circular.

3. An assembly as claimed in claim 2 in which both projections of the core and both apertures in the die are circular, and wherein the circular projections share a common axis.

4. An assembly as claimed in claim 2 in which the at least one circular projection of the noncircular core has a circumferentially extending groove.

5. An assembly as claimed in claim 2 in which the at least one circular projection of the noncircular core has a radially extending hole.

6. An assembly as claimed in claim 4 in which the corresponding aperture in the die has a radially extending pin arranged to locate in the circumferentially extending groove on the circular projection of the noncircular core to locate the noncircular core longitudinally in the die.

7. An assembly as claimed in claim 5 in which the corresponding aperture in the die has a radially extending pin arranged to locate in the radially extending hole in the circular projection of the noncircular core to locate the noncircular core longitudinally in the die and to locate the noncircular core angularly with respect to the axis of the aperture in the die.

8. An assembly as claimed in claim 6 in which the pin is biased or spring loaded.

9. An assembly as claimed in claim 3 in which at least one of the circular projections has a radially extending member, the corresponding aperture has a radial slot in which the member locates.

10. An assembly as claimed in claim 9 in which an adjustable screw is provided in the die to limit angular movement of the noncircular core.

11. An assembly as claimed in claim 1 in which at least one of the part circular projections has a radially extending member, the corresponding aperture has a slot in which the member locates.

12. An assembly as claimed in claim 11 in which an adjustable screw is provided in the die to limit angular movement of the noncircular core.

13. An assembly as claimed in any of claims 1 to 8 in which the die and the noncircular core define the shape of a pattern of a hollow turbine blade or turbine vane.

14. A noncircular core for making a pattern of a hollow component, the noncircular core having two shaped projections for locating in correspondingly shaped apertures in a die, the projections extending from opposite ends of the noncircular core, both of the projections of the noncircular core having a portion that is circular, each circular portion having an axis of rotation, said circular portions of said projections sharing a common axis.

15. A core as claimed in claim 14 in which at least one of the projections of the noncircular core is circular.

16. A core as claimed in claim 15 in which both projections of the noncircular core are circular, and the axes of the circular projections share a common axis.

17. A core as claimed in claim 15 in which the at least one circular projection of the noncircular core has a circumferentially extending groove.

18. A core as claimed in claim 15 in which the at least one circular projection of the noncircular core has a radially extending hole.

19. A core as claimed in claim 16 in which at least one of the circular projections has a radially extending member.

20. A core as claimed in claim 14 in which at least one of the part circular projections has a radially extending member.

21. A die for making a pattern of a hollow component, the die having shaped apertures at opposite ends for receiving correspondingly shaped projections of a noncircular core, both of the apertures having a circular portion, said apertures having a radially extending pin, said circular portions of said apertures in the die sharing a common axis.

22. A die as claimed in claim 21 in which both apertures in the die are circular and the axes of the apertures share a common axis.

23. A die as claimed in claim 21 in which the pin is biased or spring loaded.

24. A die as claimed in claim 21 in which the other aperture in the die is part circular.

25. A die as claimed in claim 21 in which the die has at least one support member to support the noncircular core in spaced relationship from the die.

26. A method of manufacturing a wax pattern of a hollow component comprising (a) placing a noncircular core within, and in spaced relationship from, a die to define the shape of the pattern of the hollow component, the noncircular core having two shaped projections which locate in correspondingly shaped apertures in the die, the projections extending from the opposite ends of the noncircular core, both of the projections of the noncircular core and the corresponding aperture in the die having a circular portion (b) supplying molten wax into the space between the noncircular core and the die (c) allowing the wax to solidify to form a wax pattern and (d) removing the wax pattern and noncircular core from the die.

27. A method as claimed in claim 26 in which before the noncircular core is placed in the die chaplets are placed on the noncircular core to maintain correct spacing between the noncircular core and the die.

28. A method of manufacturing a hollow metal component comprising
(a) making a wax pattern of a hollow component, placing a ceramic noncircular core within, and in spaced relationship from, a die to define the shape of the pattern of the hollow component, the noncircular core having two shaped projections which locate in correspondingly shaped apertures in the die, the projections extending from opposite ends of the noncircular core, both of the projections being circular, supplying molten wax into the space between the noncircular core and the die, allowing the wax to solidify to form a wax pattern, removing the wax pattern and the core from the die,
(b) assembling the wax pattern on a wax gating tree, to form a wax mould assembly,
(c) applying ceramic to the wax mould assembly to form a ceramic mould assembly,
(d) removing the wax from the ceramic mould assembly,
(e) supplying molten metal into the ceramic mould assembly to form a metal component,
(f) removing the ceramic noncircular core from the metal component to form the hollow metal component.

29. An assembly for making a pattern of a hollow component, the assembly comprising a die and a noncircular core which is located within and in spaced relationship from the die to define an internal shape of a pattern of a hollow component, the noncircular core having two shaped projections which locate in correspondingly shaped apertures in the die, said projections extending from opposite ends of the noncircular core, both of said projections of said noncircular core, and the apertures in said die having at least a portion which is circular, at least one of the portions of said projections having a radially extending member, the corresponding aperture having a slot in which the radial extending member locates, said slot being elongated in a circumferential direction to allow relative rotation between said die and said noncircular core to control the spacing between said die and said noncircular core.

30. The die as claimed in claim 29, wherein said die has an adjustable screw which is extendable into the slot to limit angular movement of said radially extending member and noncircular core.

31. The invention as claimed in claim 29, wherein said projections of said noncircular core are circular and both apertures and said die are circular, said circular projections sharing a common axis.

32. The invention as claimed in claim 29, wherein both said projections of said noncircular core have a radially extending member and both apertures have an elongated slot.

33. A core for use in an assembly for making a pattern of a hollow component, said core being noncircular and locatable within and in spaced relationship from a die to define an internal shape of the pattern of the hollow component, said core having two projections each extending from opposite sides of said core, said projections having portions which are curved about a common axis and each having a radially extending member.

* * * * *